(12) United States Patent
Yu (10) Patent No.: US 8,370,612 B2
(45) Date of Patent: Feb. 5, 2013

(54) COMPUTER SYSTEM WITH BUILT-IN HIDDEN TWO OPERATING DEVICES

(75) Inventor: Chun-Te Yu, Sijhih (TW)

(73) Assignee: Felicity Taiwan Corporation, New Taipei (TW)

( * ) Notice: Subject to any disclaimer, the term of this patent is extended or adjusted under 35 U.S.C. 154(b) by 656 days.

(21) Appl. No.: 12/356,297

(22) Filed: Jan. 20, 2009

(65) Prior Publication Data

US 2010/0185842 A1 Jul. 22, 2010

(51) Int. Cl.
*G06F 9/00* (2006.01)
(52) U.S. Cl. .............................. 713/2; 713/1
(58) Field of Classification Search .............. 713/2, 1
See application file for complete search history.

(56) References Cited

U.S. PATENT DOCUMENTS

| | | | | |
|---|---|---|---|---|
| 5,269,022 A | * | 12/1993 | Shinjo et al. | 713/2 |
| 5,333,273 A | * | 7/1994 | Raasch et al. | 710/67 |
| 5,809,145 A | * | 9/1998 | Slik et al. | 705/52 |
| 6,101,601 A | * | 8/2000 | Matthews et al. | 713/2 |
| 6,178,503 B1 | | 1/2001 | Madden et al. | |
| 6,219,721 B1 | | 4/2001 | Su | |
| 6,292,890 B1 | * | 9/2001 | Crisan | 713/2 |
| 6,754,818 B1 | * | 6/2004 | Lee et al. | 713/2 |
| 6,931,525 B2 | * | 8/2005 | Numata et al. | 713/100 |
| 7,234,051 B2 | * | 6/2007 | Munguia et al. | 713/2 |
| 7,356,677 B1 | | 4/2008 | Rafizadeh | |
| 7,424,601 B2 | | 9/2008 | Xu | |
| 2002/0099971 A1 | * | 7/2002 | Merkin et al. | 714/6 |
| 2009/0172382 A1 | * | 7/2009 | Hsieh | 713/2 |
| 2010/0106955 A1 | * | 4/2010 | Odell | 713/2 |

* cited by examiner

*Primary Examiner* — Chun Cao
(74) *Attorney, Agent, or Firm* — C. G. Mersereau; Nikolai & Mersereau, P.A.

(57) ABSTRACT

A computer system includes at least a first and a second operating device and a control module. The control module sends at least one signal to a central processing unit for managing and controlling the first and the second operating device, and copying the contents of any one of the two operating devices to the other operating device, so that both of the first and second operating devices include an operating system, and the computer system can select any one of the first and second operating devices for booting the operating system and power off or power on the other non-selected operating device.

9 Claims, 10 Drawing Sheets

COMPUTER SYSTEM WITH BUILT-IN HIDDEN TWO OPERATING DEVICES

FIELD OF THE INVENTION

The present invention relates to a computer system with two operating devices and control method thereof, and more particularly, to a computer system and control method that uses a control module to manage and control a plurality of operating devices and to select any one of the operating devices as a source device for booting an operating system.

BACKGROUND OF THE INVENTION

It has been more than twenty years since the development of personal computer. In the past twenty years, the personal computer has been largely improved in terms of its hardware configuration and software application function. Generally speaking, computer executable programs can be divided into two phases, one of which includes the program that is to be executed immediately after the power-on of the computer, i.e., the basic input output system (BIOS), and the other one includes all the application programs that are to be run under the environment of an operating system (OS) after the operating system has been booted.

The BIOS generally provides two functions, one of which is to conduct Power On Self Test (POST) and initialization, and the other one is program service process and hardware interrupt process.

The operating system and all the application programs are installed on the hard disk drive (HDD). When the BIOS has completed the POST and initialization, the operating system on the HDD is immediately booted into a dynamic random access memory (DRAM) of the system hardware to execute related programs.

However, the currently available personal computer has at least the following disadvantages:

(1) Lacking timeliness: In recent years, while the personal computer with built-in digital still camera (DSC, also referred to as CMOS camera module) and digital television (DTV) functions has become highly popularized, these two functions must be operated under the environment of an operating system, such as Windows series operating systems, Linux, or the like, and so are other programs, such as address book software and To-Do list software. And, it takes more than one to two minutes from powering on the computer to successfully booting the operating system and then running a certain application program. Thus, the existing personal computer lacks timeliness.

(2) Insufficient stability: In the past twenty or more years, the operating system for a personal computer is placed on the HDD. All computing can be conducted only when the operating system has been booted into the DRAM of the computer. A spindle motor of the HDD in working rotates at a high speed. Generally, a 2.5" HDD has a rotating speed from 5400 to 7200 rpm, while a 3.5" HDD has a rotating speed higher than 10,000 rpm. Data is accessed via a voice coil motor and a stepping motor, which reciprocate on the hard disk, and the HDD reads and writes such reciprocating movements to complete the data access. Under the working conditions of high rotating speed and high working temperature, the HDD is easily damaged due to an external vibration force, resulting in damage or loss of important data stored thereon. For example, the HDD of the notebook computer has an annual return rate (ARR) or annual failure rate (AFR) generally between 0.75% and 1%. In other words, there are about 1% of notebook computers being failed and requiring repair each year. That is why most personal computer users have to buy an external HDD as a backup data storage device.

(3) Potential risk in computer security: Due to the quick development of Internet in recent years, any computer owned by any user and used at any time and place is subject to virus invasion. The virus threats just exist around you! There are various kinds of anti-virus programs constantly developed against different computer viruses and being available in the market. However, these anti-virus programs fail to catch up with the development of computer viruses and could not solve the problem of virus invasion successfully. Even if the computer users have tried every way to protect their computers against virus invasion, there are still a lot of users who have to re-install the operating system of the computer due to virus invasion.

It is therefore tried by the inventor to develop a computer system with two operating devices and a control method thereof in an attempt of overcoming the above-mentioned disadvantages.

SUMMARY OF THE INVENTION

A primary object of the present invention is to provide a computer system with two operating devices, in which a control module is used to manage and control a first and a second operating device, and the operating system and contents of any one of the two operating devices can be copied to the other operating device, such that, in the event the operating system or the contents of one of the two operating devices are damaged due to unexpected vibration or virus invasion, a user can select to boot and execute the operating system or contents on the other operating device, and uses the other operating device as a source to restore the damaged operating device immediately.

Another object of the present invention is to provide a computer system with two operating devices, of which a basic input output system (BIOS) unit further includes a digital still camera (DSC) device driver and a digital television (DTV) device driver, as well as a personal information management (PIM) sub-module, a DSC sub-module, a DTV sub-module, and a working mode selection module for selectively enabling the DSC sub-module, the DTV sub-module, a first operating device, and a second operating device, such that the DSC sub-module and the DTV sub-module can be used without the operating system, and a user can select any one of the two operating devices as a source operating system device to boot and execute the operating system.

A further object of the present invention is to provide a control method for a computer system with two operating devices. The control method includes the steps of selecting a first operating device as an enabling device and an operating system source, booting the operating system into a DRAM for running, and turning off a power supply to a second operating device; or selecting the second operating device to be an enabling device and an operating system source, booting the operating system into the DRAM for running, and turning off the power supply to the first operating device; ending the operation to shut down the computer or go to a sleeping mode; selecting to copy or not to copy; if selecting to copy, going to a copy procedure, in which the first or the second operating device is powered on, the objects to be copied are selected to complete the copying, the first or the second operating device is powered off, and the content of a BIOS unit of the computer system is copied or updated; and if selecting not to copy, going to an ending procedure.

A still further object of the present invention is to provide a computer readable recording medium having a computer program stored thereon, so that a computer with the computer readable recording medium can boot and execute the computer program to implement the above-described control method.

A still further object of the present invention is to provide a computer program product having a control module stored thereon, so that a computer with the computer program product installed thereon can boot and execute the computer program to implement the above-described control method.

To achieve the above and other objects, the computer system with two operating devices according to the present invention includes at least one operating interface; a first operating device, which includes an operating system and a plurality of data and programs, and can be a hard disk drive (HDD) or a flash memory connected to the operating interface; a second operating device, which is used to store the operating system and the data and the programs of the first operating device, and can be a flash memory connected to the operating interface; a central processing unit (CPU), which receives at least one signal to control the first and the second operating device via the operating interface; a control module, which sends the signal to the CPU for controlling the first and the second operating device and copying the contents of anyone of the two operating devices to the other operating device; a basic input output system (BIOS) unit for booting the operating system on any one of the first and the second operating device into a dynamic random access memory (DRAM) for running; and a decoder unit for decoding the BIOS unit, so that the BIOS unit can be used by the CPU.

The BIOS unit provided by the present invention further includes a DSC device driver, a DTV device driver, and a working mode selection module. The working mode selection module includes a personal information management (PIM) sub-module, a DSC sub-module, a DTV sub-module, and an operating system (OS) device select sub-module. The PIM sub-module provides a computing function, a name card book function, a To-Do list function, and a database management function. The DSC sub-module is adapted to enable the DSC device, and the DTV sub-module is adapted to enable the DTV device. The OS device select sub-module is used to select one of the first and the second operating device for booting the operating system.

To achieve the above and other objects, the control method according to the present invention includes the following steps: (1) selecting an operating device; (2) selecting the first operating device as an enabling device and an operating system source, booting the operating system into a DRAM for running, and turning off a power supply to the second operating device; or (3) selecting the second operating device to be an enabling device and an operating system source, booting the operating system into the DRAM for running, and turning off the power supply to the first operating device; (4) ending the operation to shut down the computer or go to a sleeping mode; (5) selecting to copy or not to copy; if selecting to copy, going to a copy procedure, in which the first or the second operating device is powered on, objects to be copied are selected to complete the copying, the first or the second operating device is powered off, and the content of a BIOS unit of the computer system is copied or updated; and if selecting not to copy, going to an ending procedure.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention provides a computer system with two operating devices and a control method thereof, and will now be described with a preferred embodiment thereof. Please refer to FIG. 1, which is a block diagram of the computer system of the present invention. As shown, the computer system includes at least one operating interface 6000; a first operating device 4000, which includes an operating system and a plurality of data and programs, and connected to the operating interface 6000; a second operating device 5000, which is adapted to store the aforesaid operating system, data and programs thereon, and connected to the operating interface 6000; a central processing unit (CPU) 1000 and a system chipset 1001, which are connected to the operating interface 6000 and a operating device power supply 1002, which, in turn, is supplied by overall power supply shown at 1003, and the operating device power supply 1002 is also connected to the first and the second operating device 4000, 5000; a control module 9000 for controlling the first operating device 4000 and the second operating device 5000, and copying the contents of any one of the first and the second operating devices 4000, 5000 to the other one of them; a basic input output system (BIOS) unit 3000 for booting the operating system on any one of the first operating device 4000 and the second operating device 5000 into a dynamic random access memory (DRAM) 8000 for running; and a decoder unit 2000 capable of decoding the BIOS unit 3000 for use by the CPU 1000.

Figure 1:
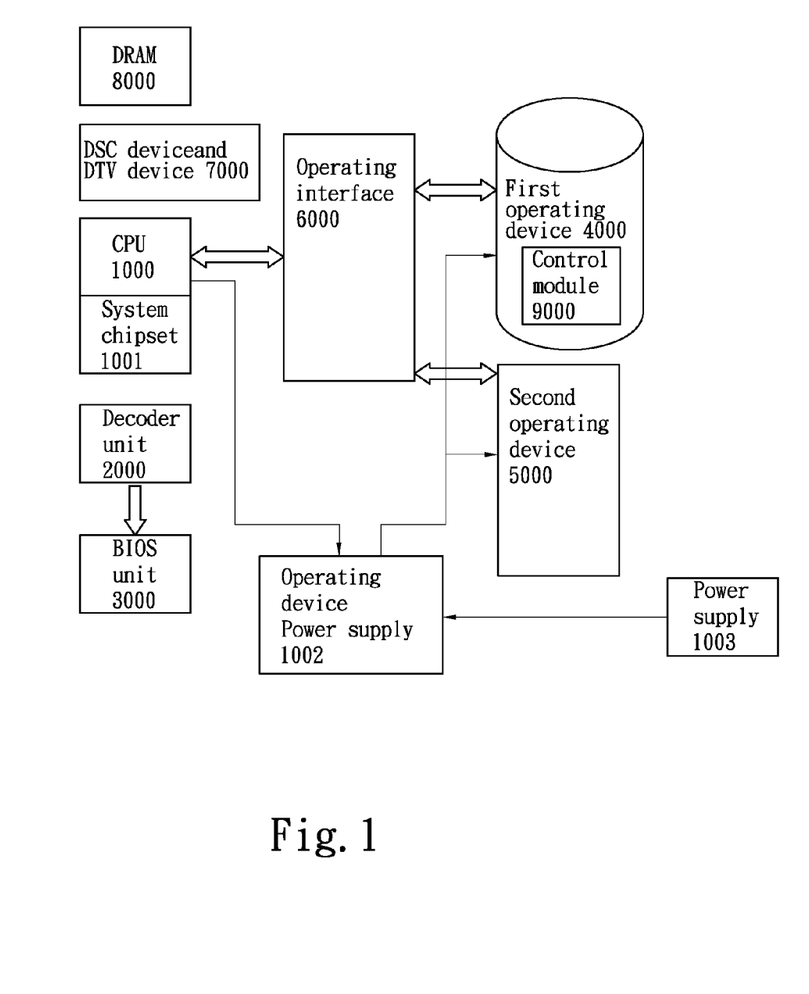
FIG. 1 is a block diagram of a computer system according to the present invention.

The CPU 1000 receives at least one signal to control the first and the second operating device 4000, 5000 via the operating device power supply 1002, and to run and compute the operating system and the plurality of data and programs on the first and the second operating device 4000, 5000 via the operating interface 6000.

The system chipset 1001 includes a north-bridge chip and a south-bridge chip, a video chipset, a network-on-chip, etc.

The first operating device 4000 is a basic computer component in the present invention, and is used as a storage device for storing the aforesaid operating system as well as the data and programs, including various drivers and application programs. The first operating device 4000 can be a hard disk drive (HDD) or a non-volatile memory. In the present invention, the HDD is selected in the first priority for use as the first operating device 4000 because the HDD is highly popular and reasonable in terms of its capacity and price. However, the first operating device 4000 for the present invention is not necessarily limited to a HDD.

The second operating device 5000 is used to store the operating system as well as the plurality of data and programs, including various drivers and application programs, selected by the control module 9000. The second operating device 5000 is a non-volatile memory. When the control module 9000 copies the operating system, various drivers, as well as selected application programs for copying and other affixed files and data files thereof from the first operating device 4000 to the second operating device 5000, the second operating device 5000 becomes an operating device that can be powered on for use.

The operating system can be any one of the Microsoft Windows series operating systems, such as Windows 2000, Windows XP, Windows Vista and Windows 7, UNIX, BSD, Linux, and MAC OS.

By non-volatile memory, it means a computer memory that can retain the stored data even when not powered. The non-volatile memory can be divided into two categories, namely, read-only memory (ROM) and flash memory, depending on whether the stored data can be rewritten or not at any time when using the computer. In the present invention, the non-volatile memory is preferably a flash memory, which is not limited in capacity and can be used according to actual need. Since the flash memory is not an electromechanical device and does not include any voice coil motor or stepping motor, it can have much faster operating speed and much lower power consumption compared to a HDD.

The operating interface 6000 is an interface between the computer system hardware and the first and second operating devices 4000, 5000, and can be a Parallel ATA (P-ATA), a Serial ATA (S-ATA), an SCSI, a USB, or a system memory address map. More specifically, when the first operating device 4000 is a HDD, the operating interface 6000 is preferably a P-ATA interface (also referred to as an Enhanced Integrated Device Electronics (EIDE) interface) or an S-ATA interface to connect to the south-bridge chip in the system chipset 1001. Alternatively, when the computer system uses an SCSI card, the operating interface 6000 can be an SCSI interface. On the other hand, when the first and second operating devices 4000, 5000 are of a flash memory, the operating interface 6000 can be any one of SCSI, P-ATA, S-ATA, USB, and system memory address map.

Generally, commercial computers and servers often adopt a HDD with an SCSI interface as an operating device thereof. The SCSI interface has been constantly improved more than twenty years in the past, and there are also SCSI-series products introduced into the market. Depending on different transmission rates, the SCSI-series products are divided into SCSI I having a transmission rate of 40M, SCSI II having a transmission rate of 80M, SCSI III having two transmission rates of 160M and 320M, SCSI IV, etc. Two common ones of the currently available SCSI HDD interfaces are 68-pin and 80-pin SCSI interfaces. There is also a 50-pin SCSI interface that was developed in some earlier stage. Generally speaking, a HDD using SCSI interface usually has larger capacity ratio and faster speed. For example, the spindle motor for such HDD can have a rotating speed as high as 15,000 rpm. In the present invention, if a flash memory is used as the operating device and an SCSI interface is used as the operating interface, the advantage of high speed is immediately lost because it is impossible for an electromechanical device to have an operating speed faster than a flash memory, which is completely an electronic device. The only one disadvantage of the SCSI interface is the relatively higher cost compared to general IDE (i.e., P-ATA and S-ATA) interface. This is because the system chipset of most computers does not have an SCSI control line built therein, and a user has to additionally purchase an SCSI card.

Due to the advantage of good compatibility thereof, the P-ATA and the S-ATA interfaces have been used as the operating interfaces between the flash memory and the computer system. The P-ATA interface has been used for personal computer for about 20 years. However, the S-ATA interface is a new interface having been developed in recent years mainly for upgrading data transmission rate. The P-ATA interface has been improved several times in the past twenty or more years and is relatively stable and reliable for use, and has the highest compatibility. Moreover, a P-ATA or S-ATA control line has been built in a chip of the computer system chipset, and is therefore highly popular-among users.

The simplest way to implement the design of the present invention is to build an existing USB flash memory line in the computer system, and then, under the control of the control module 9000, copy the contents of the first operating device 4000 to the second operating device 5000, or copy the contents of the second operating device 5000, including the operating system or related programs and data thereof, back to the first operating device 4000. While the traditional USB 2.0 has a transmission rate that is not fast enough, the transmission rate is no longer a problem with the USB 3.0 and other future higher versions. It is anticipated the USB interface would be largely adopted in the future due to its advantage of easy to design.

Figure 2:
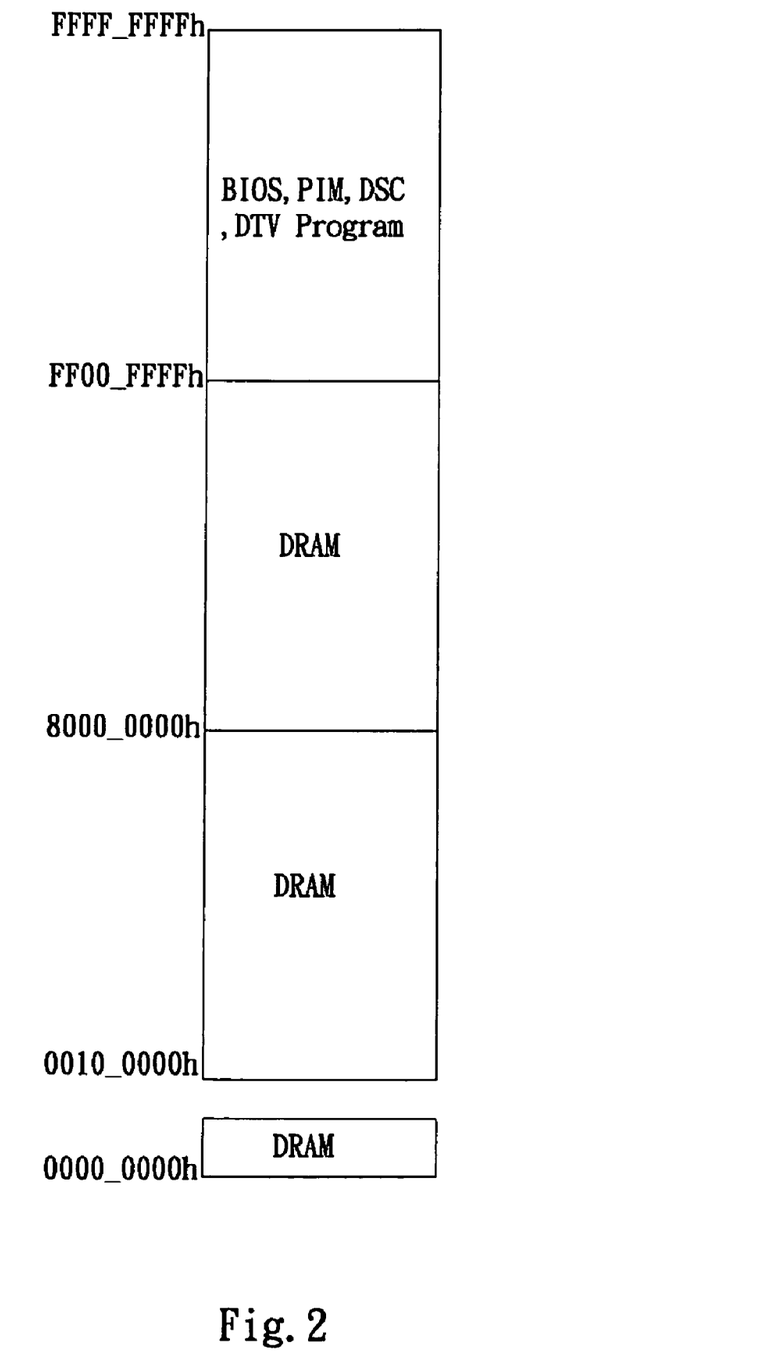
FIG. 2 is a system memory address map for the computer system of the present invention.

When the system memory address map is adopted as the operating interface, the second operating device 5000, which is a flash memory, is designed in the computer system by way of system memory address mapping. Please refer to FIG. 2, which is a system memory address map for the computer system of the present invention. Generally, the total system memory space is 4 GB, and the use of different address regions is as follows:

(1) Traditionally, the 128K from address 896K to address 1 MB (1024K) and below address 4 GB is the address region allocated to BIOS;

(2) The address region from address 000 to address 2 GB, after deducting the address region for the BIOS, is allocated to DRAM;

(3) The 1.5 GB address space above address 2 GB to address 3.5 GB is the region allocated to the flash memory of the second operating device 5000 of the present invention, and is controlled by memory banking, and there are 8 banks defining a total memory space of 12 GB. In the event the interface between the second operating device 5000 and the system does not adopt the system memory address map, this address space can be used for other purpose or reserved for the DRAM 8000. And, when the system memory address map is used as the interface between the second operating device 5000 and the system, the control module 9000 will format the flash memory forming the second operating device 5000; and, when a user has completed copying of the operating system and related files, the second operating device 5000 will then include the operating system and programs and data in the first operating device 4000.

In addition, when the system memory address map is selected as the operating interface 6000, the decoder unit 2000 is used as a banking decoding circuit for the second operating device 5000.

Figure 3:
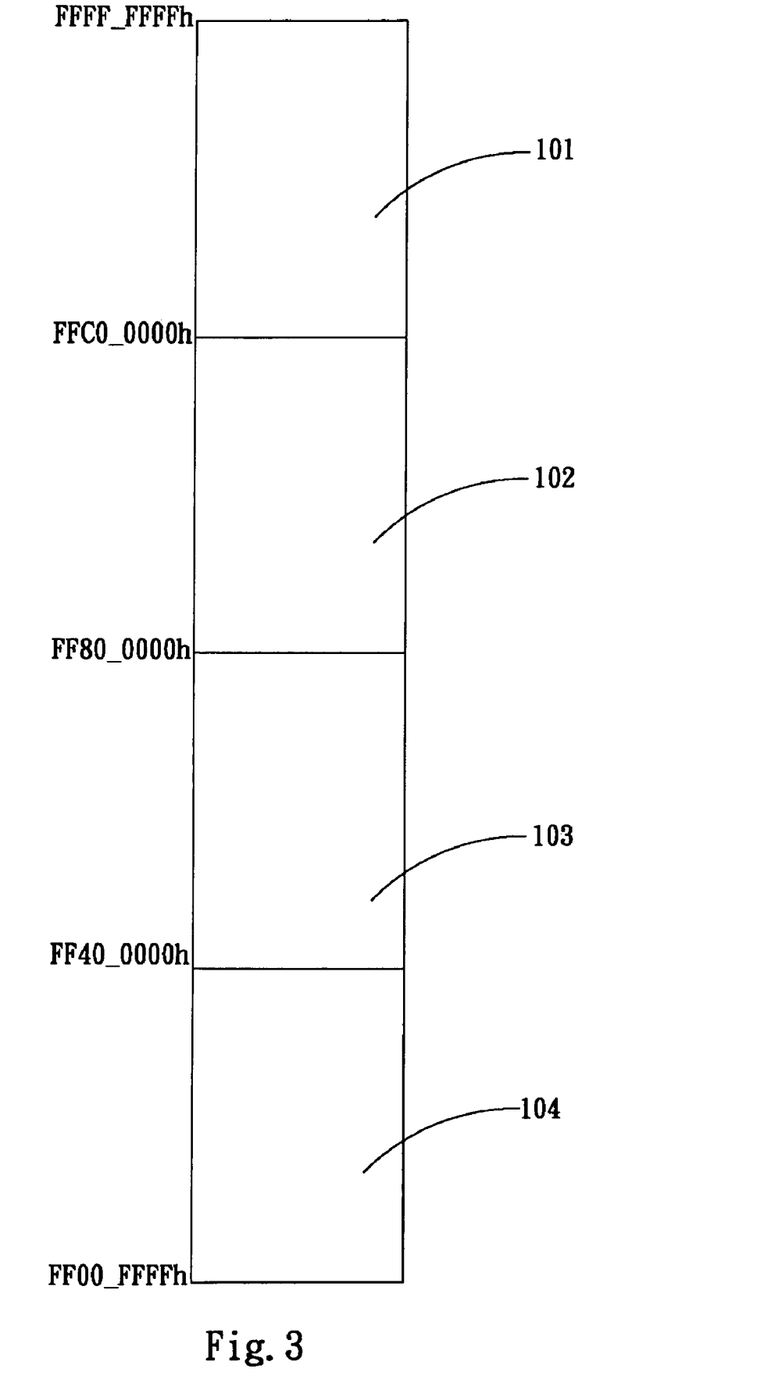
FIG. 3 is a PIM, DSC and DTV direct address decoding map for the computer system of the present invention.

When the decoder unit 2000 is used as the banking decoding circuit for the second operating device 5000, the decoder unit 2000 is a set of address decoder lines for decoding different address regions for use by the flash memory of the present invention. Generally, the decoding can be substantially divided into two types:

(1) Direct address decoding: The decoding is based directly on the total usable flash memory capacity. Please refer to FIG. 3. For example, suppose every flash memory has a capacity of 4 MB, and four flash memories 101, 102, 103, 104 are used to have a total capacity of 16 MB. In this case, the address region design for each of the four flash memories is shown in FIG. 3. When a program has run to a certain address region, the CPU 1000 will retrieve the code or data directly at the flash memory using that address region.

(2) Indirect address decoding: This decoding type is also referred to as "banking". Using the same example as that in the paragraph (1), when the indirect address decoding is adopted, the four flash memories are able to use a common address region, which has a total memory capacity of 4 MB only. When a program wants to jump to a certain flash memory (or a certain bank) for running, the program itself must first proceed with bank switching. That is, enables that bank at the next output instruction. With the indirect address decoding, all the flash memories use the same address region, but only one of the flash memories can work at any one time.

Figure 4:
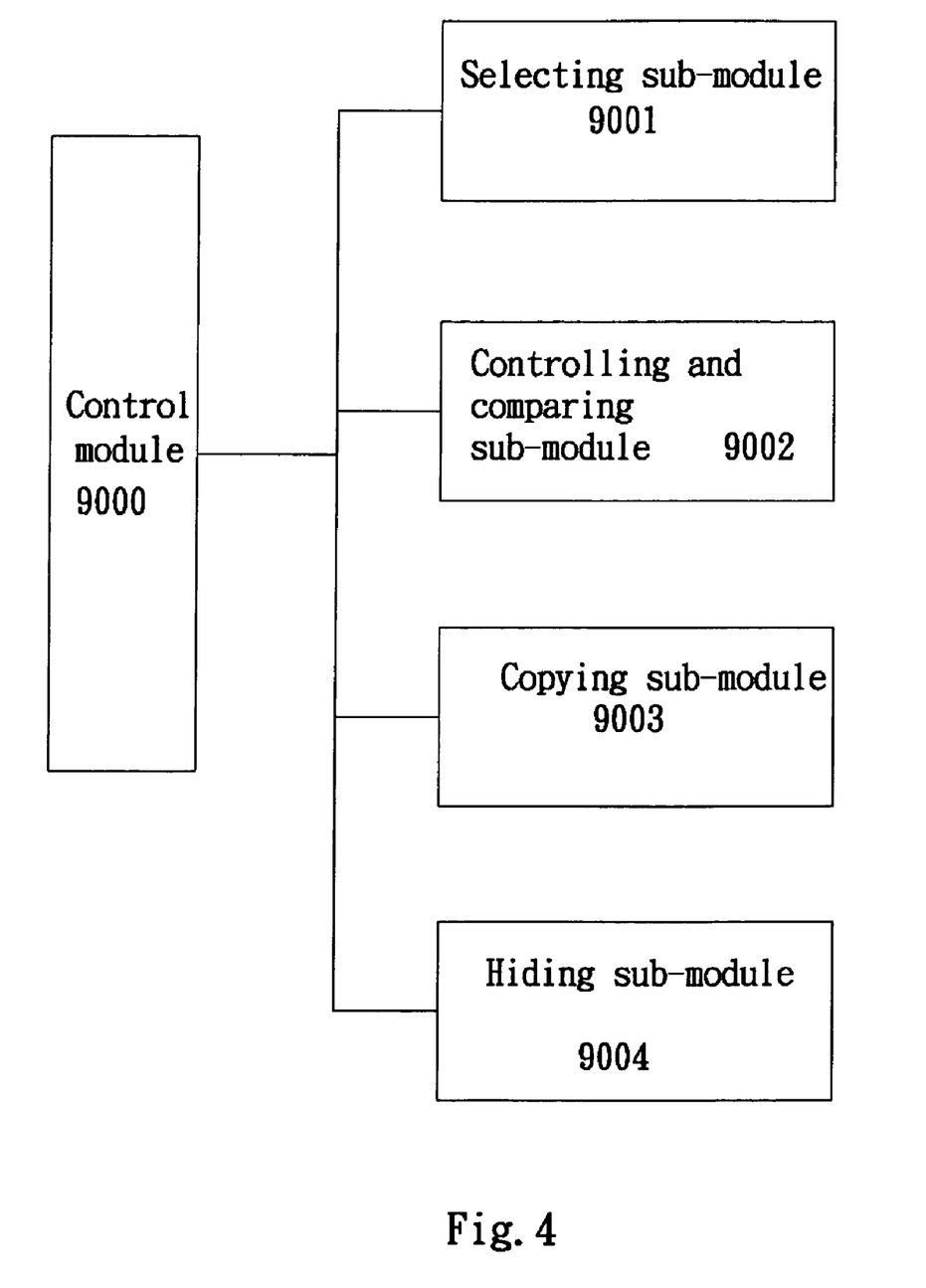
FIG. 4 is a block diagram of a control module for the computer system of the present invention.

FIG. 4 is a block diagram of the control module 9000, which sends a signal to the CPU 1000 for controlling the power on/off of the first and the second operating device 4000, 5000. The control module 9000 includes a selecting sub-module 9001, a controlling and comparing sub-module 9002, a copying sub-module 9003, and a hiding sub-module 9004. The selecting sub-module 9001 selects to boot the operating system from the first operating device 4000 or the second operating device 5000. The controlling and comparing sub-module 9002 checks and displays the operating system and the plurality of data and programs on any one of the first and the second operating device 4000, 5000, and selects at discretion the operating system and the plurality of data and programs on one of the operating device as the objects to be copied. The copying sub-module 9003 copies the selected objects to the other non-selected operating device. The hiding sub-module 9004 hides the non-selected operating device. By setting a user password and using the operating device power supply 1002 to power off the first operating device 4000, for example, and all the messages in the system having relation to the setting of the first operating device 4000, it is possible to completely stop any computer virus from invading the HDD. In similar manner, it is also able to power off the second operating device 5000, depending on the selection made by the selecting sub-module 9001.

As can be seen from FIG. 1, the CPU 1000 is further connected to a digital still camera (DSC) device and digital television (DTV) device 7000. And, the BIOS unit 3000 further includes a personal information management (PIM) sub-module 200 (see FIG. 5), a DSC device driver, a DTV device driver, and a working mode selection module 100 (see FIG. 5). Please refer back to the system memory address map in FIG. 2. In the present invention, for the purpose of having sufficient memory space for placement of these drivers, sub-modules and modules, the initial memory capacity for the BIOS is expanded from 512 KB to 16 MB. And, the 16 MB below the aforesaid total system memory space address of 4 GB, after deducting the traditional BIOS address region, is used for placement of the PIM sub-module 200, the DSC device driver, the DTV device driver, and the working mode selection module 100. The decoder unit 2000 is used to decode the 16 MB address allocated to the BIOS.

The DSC device and DTV device 7000 is built in the computer system. When a user selects via the working mode selection module 100 one of the DSC and DTV devices, the selected DSC or DTV device is turned on and its driver is run. On the other hand, the non-selected DSC or DTV device is turned off. For example, when the user selects to turn on the DSC device, the DTV device and the first and second operating devices as well as the control chips in connection with these devices are turned off to save power consumption.

The DRAM 8000 provides the CPU 1000 with functions of computing and temporary storing data as well as booting and running programs, and serves as a computing memory device and register for the aforesaid PIM sub-module, DSC device driver, DTV device driver, and other programs.

Figure 5:
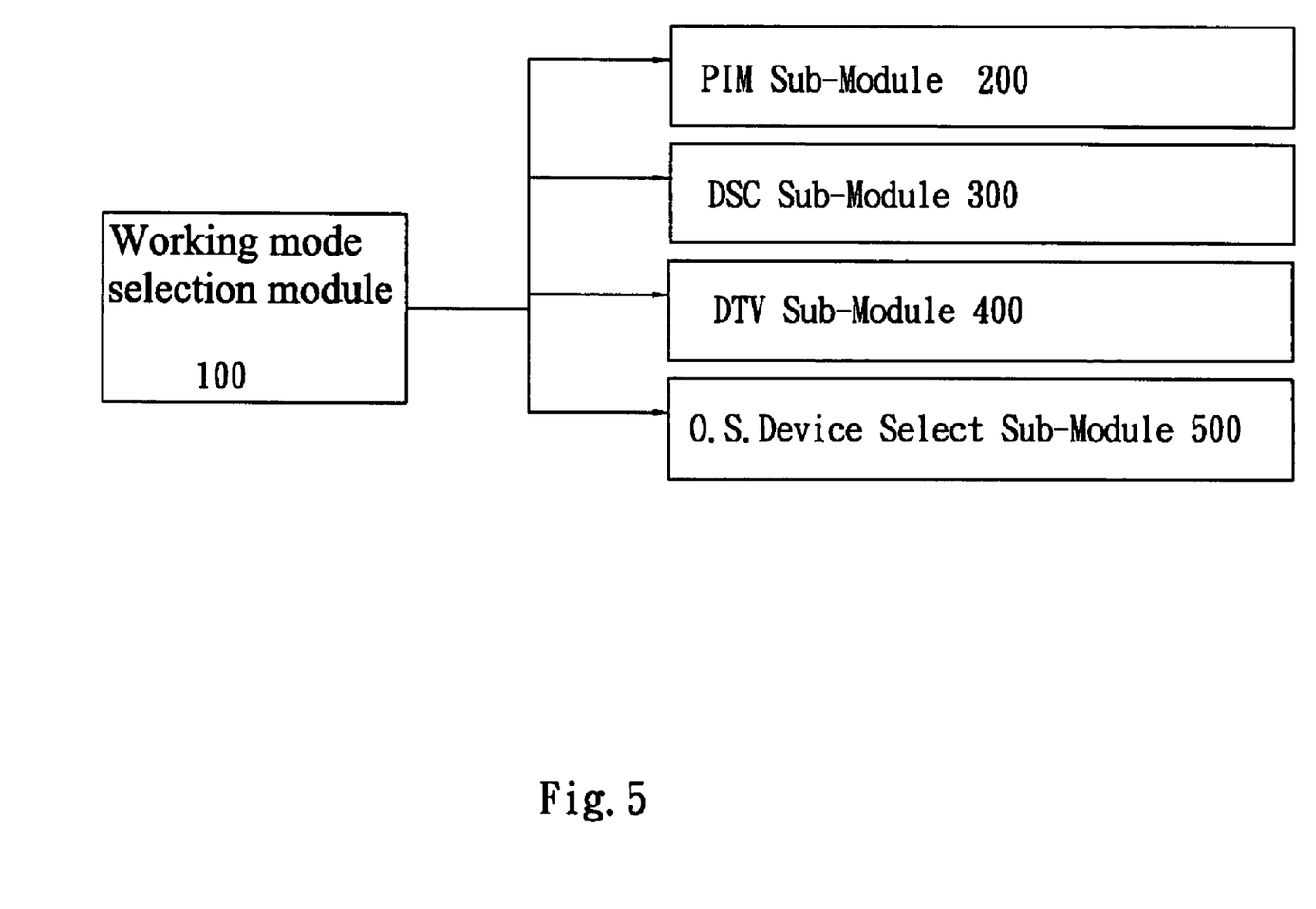
FIG. 5 is a block diagram of a working mode selection module for the computer system of the present invention.

Please refer to FIG. 5. The working mode selection module 100 is internally built (recorded) in the BIOS, and includes the aforesaid PIM sub-module 200, a DSC sub-module 300, a DTV sub-module 400, and an operating system (OS) device select sub-module 500. The DSC sub-module 300 and the DTV sub-module 400 are adapted to enable the DSC device and the DTV device 7000, respectively, as well as the drivers thereof. The OS device select sub-module 500 is used to select one of the first and the second operating device 4000, 5000 for booting the operating system.

The PIM sub-module 200, the DSC sub-module 300, the DTV sub-module 400, and the OS device select sub-module 500 can also be enabled under control via a remote signal. The remote signal is sent by pushing at least one hot key. The hot key(s) can be implemented by designing four keys on the keyboard, and separately connecting these four keys to four pins on a keyboard controller chip in the computer system hardware. When the BIOS has completed the self-test and reads in the user key code from the keyboard controller, the BIOS will directly jump to the program of the sub-module corresponding to the pushed hot key.

Figure 6:
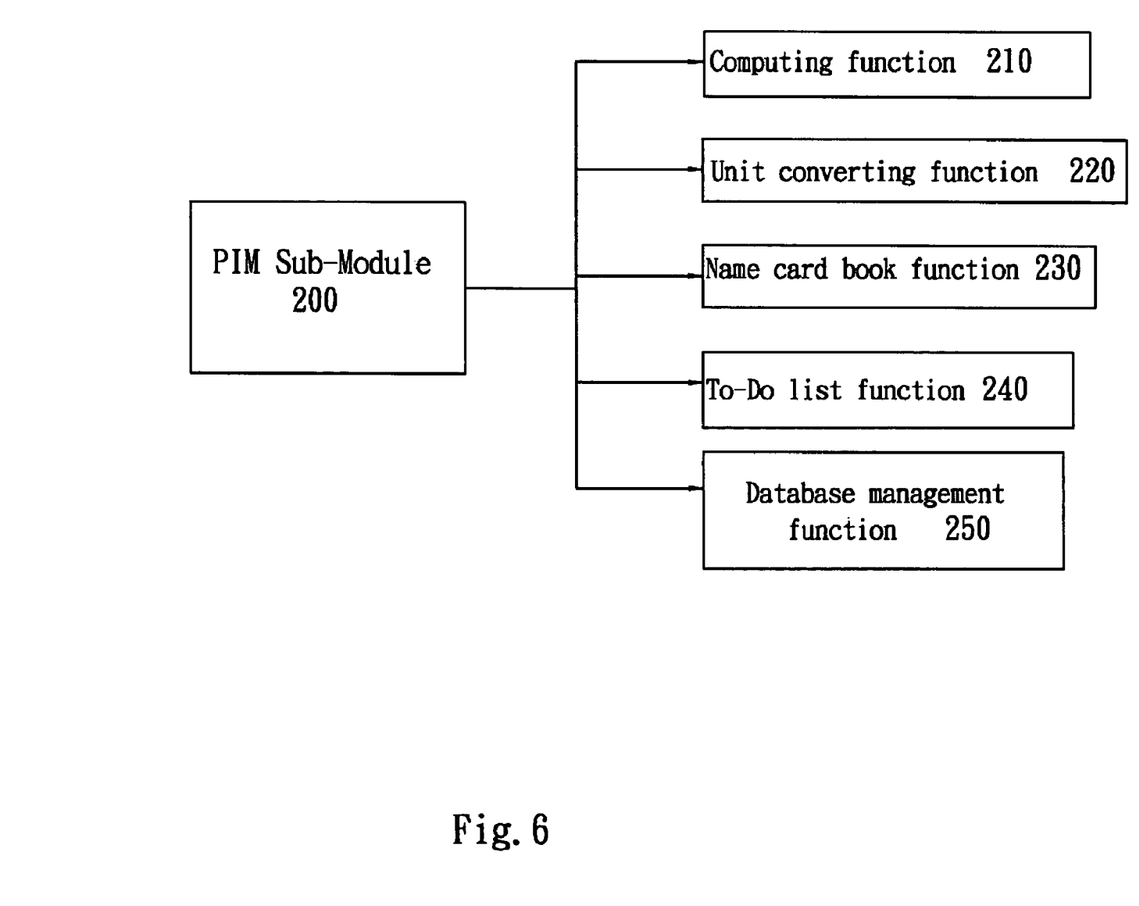
FIG. 6 is a block diagram of a personal information management (PIM) sub-module for the computer system of the present invention.

Please refer to FIG. 6. An embodiment of the PIM sub-module 200 provides a computing function 210, a unit converting function 220, a name card book function 230, a To-Do list function 240, and a database management function 250. With the name card book function 230, a user can browse and edit name card book data without the operating system, and the name card book data can be written into the BIOS unit 3000 or the first operating device 4000 and the second operating device 5000 under the control of the database management function 250. With the To-Do list function 240, a user is allowed to browse and edit To-Do-List data without the operating system, and the To-Do list data can be written into the BIOS unit 3000 or the first operating device 4000 and the second operating device 5000 under the control of the database management function 250. The database management function 250 is mainly used in database synchronization. In other words, the contents of the name card book and the To-Do list in the PIM sub-module 200 are identical to the name card book and T-Do list data in the first operating device 4000 and/or the second operating device 5000. The database management function 250 of the present invention can store data files of the PIM sub-module 200 on the first operating device 4000 and/or the second operating device 5000.

Figure 7:
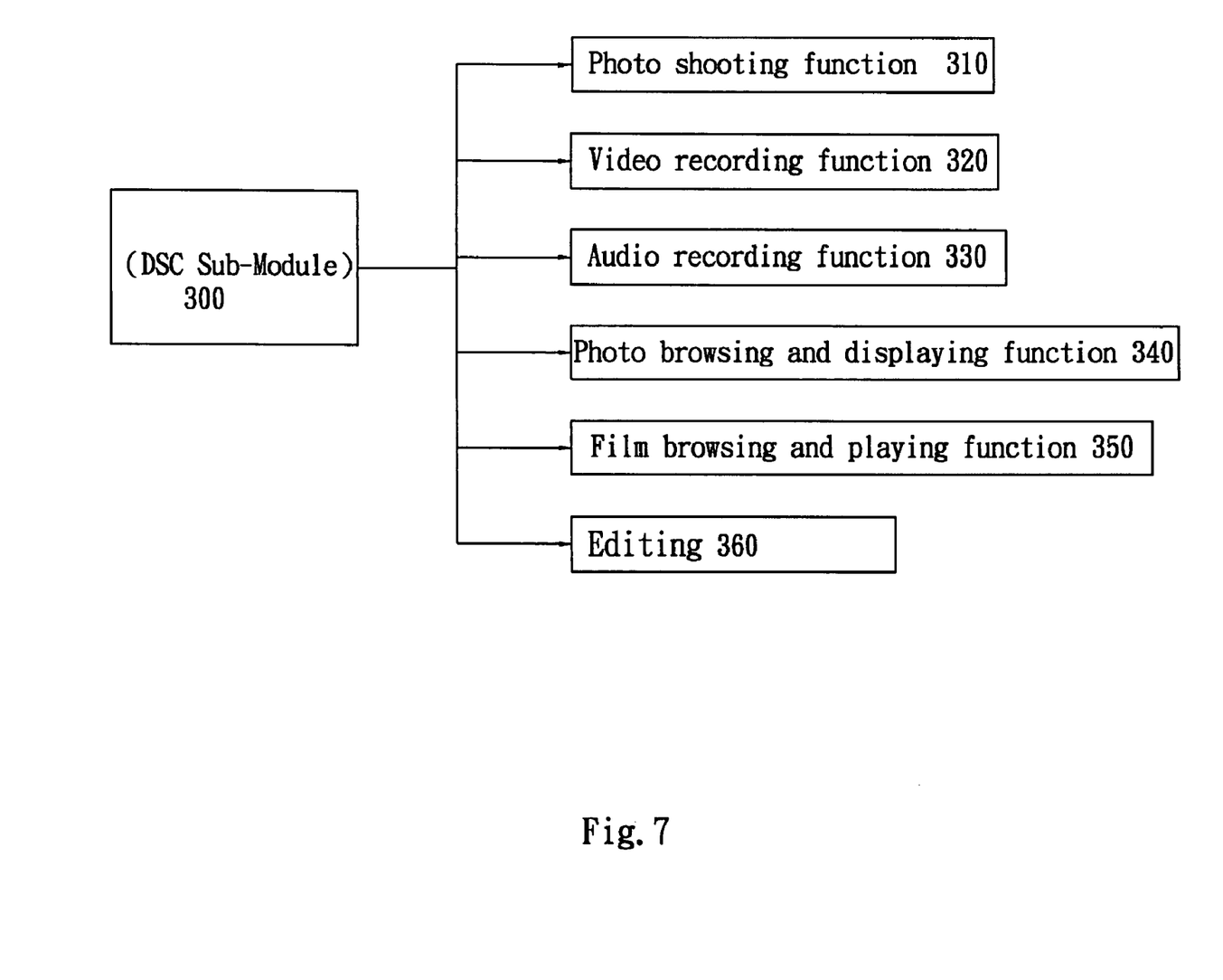
FIG. 7 is a function block diagram of a DSC sub-module for the computer system of the present invention.

Please refer to FIG. 7. The DSC sub-module 300 enables the DTV device to be ready for use just as a family TV set. An embodiment of the DSC sub-module 300 provides a photo shooting function 310, a video recording function 320, an audio recording function 330, a photo browsing and display function 340, a film browsing and playing function 350, and an editing function 360.

Figure 8:
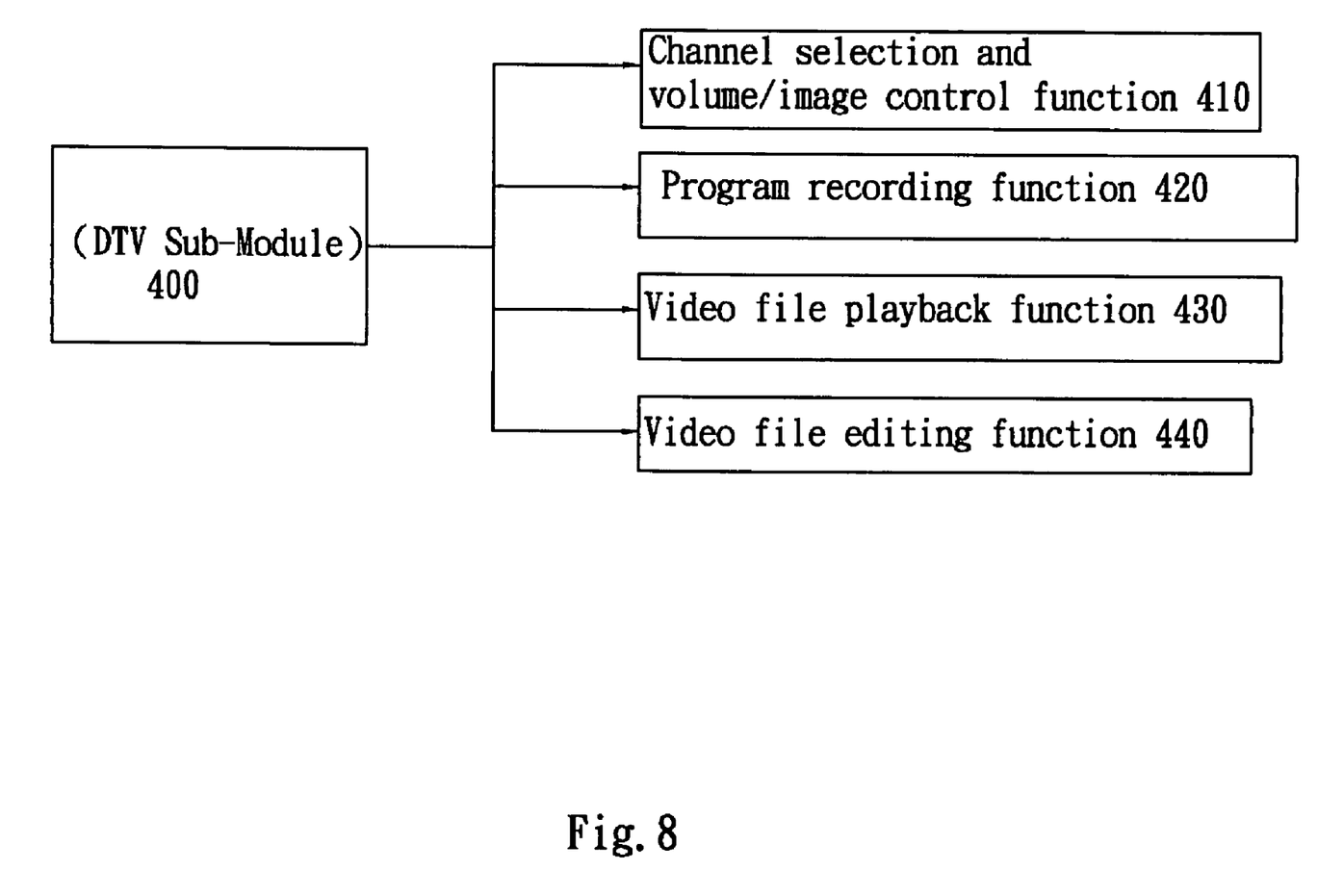
FIG. 8 is a function block diagram of a DTV sub-module for the computer system of the present invention.

Please refer to FIG. 8. An embodiment of the DTV sub-module 400 provides a channel-selection and volume/image control function 410, a program recording function 420, a video file playback function 430, and a video file editing function 440.

Traditionally, the BIOS has a capacity of about 2 Mb (that is, 512 KB or 512K bytes). However, in the present invention, the BIOS has a capacity of 16 MB. The increased capacity for the BIOS in the present invention is used to store the PIM sub-module 200 and the contents thereof, the DSC device driver, and the DTV device driver. In the event a large volume of data under the DSC sub-module 300 or the DTV sub-module 400 is to be stored, the user can directly store the data on a memory device, such as an SD, an MMC, a MicroSD, a MiniSD, and an RS-MMC Card, or on an external HDD or other external memory devices. Or, the user can enable the first or the second operating device 4000, 5000 to store the data on one of them.

The operating and control methods of the computer system of the present invention will now be described in details as below.

Figure 9:
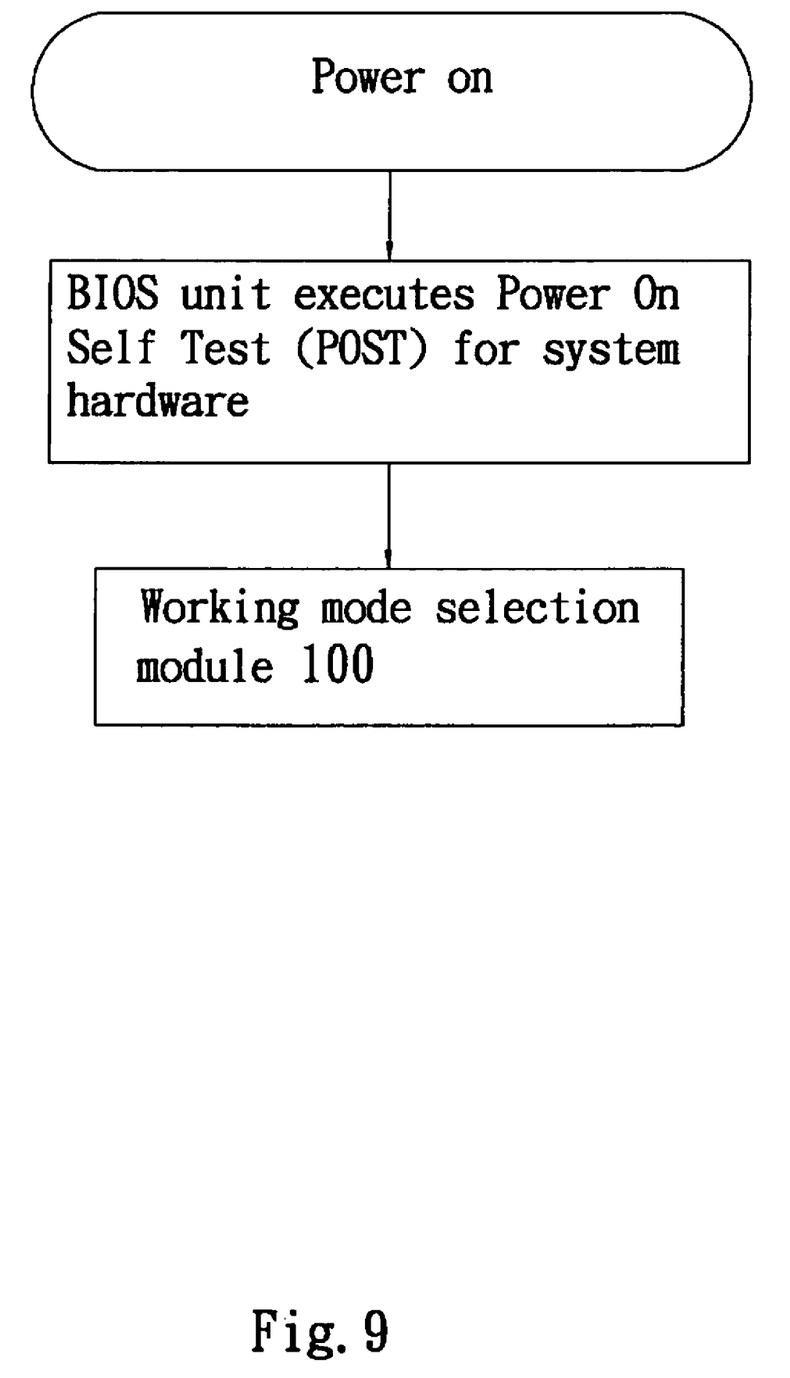
FIG. 9 is a flowchart showing steps of powering on the computer system of the present invention.

Please refer to FIGS. 3 and 9 at the same time. When the computer system is powered on, the BIOS unit 3000 will execute the Power On Self Test (POST) for the computer system. Then, the computer system will automatically go to the working mode selection module 100. From the working mode selection module 100, a user can select one of the four sub-modules, namely, the PIM sub-module 200, the DSC sub-module 300, the DTV sub-module 400, or the OS device select sub-module 500 that is to be operated. When the user has selected the desired sub-module, the devices and chips of the other three non-selected sub-modules are powered off to achieve the purpose of saving electric energy.

Figure 10:
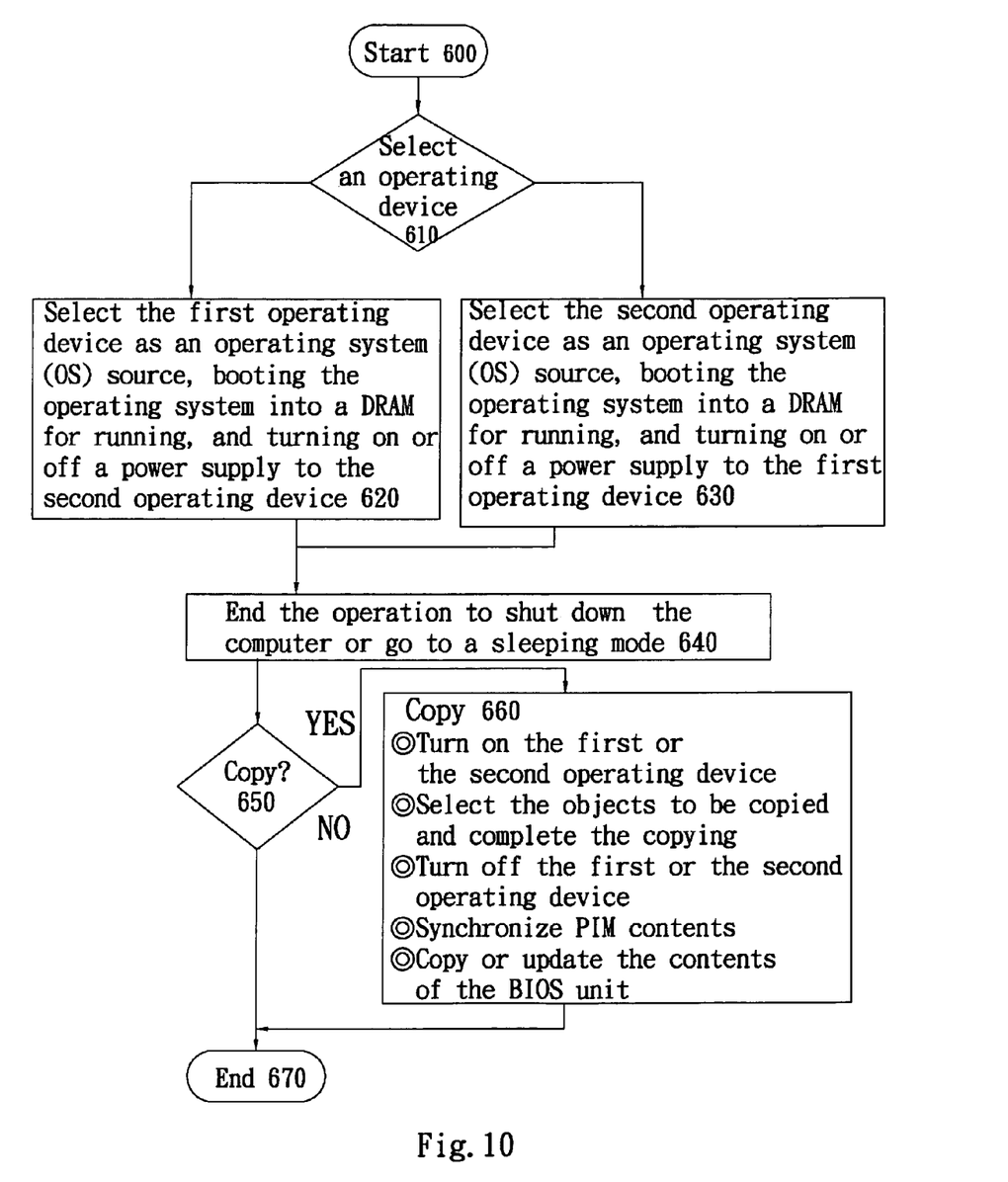
FIG. 10 is a flowchart showing the steps included in a control method of the computer system of the present invention.

Please refer to FIGS. 1 and 10 at the same time. When the user selects the OS device select sub-module 500 from the working mode selection module 100, the computer system goes to the control module 9000.

The control method of the control module 9000 includes the following steps:

Step 600: Start.

Step 610: Select an operating device, that is, select the first or the second operating device as an operating system source device to be operated. In the first use of the computer system, the second operating device 5000 is empty. Therefore, the control method will directly go to Step 660 to execute a copy procedure, so that the content of the first operating device 4000 is copied to the second operating device 5000, making the second operating device 5000 a device capable of booting the operating system and running programs. When the copying of the operating system and the application programs has been completed at the first time of powering on, the control module 9000 will allow the user to select an operating system enabling device each time the computer is powered on in the future. In the event the user selects the first operating device 4000, the method goes to Step 620; and in the event the user selects the second operating device 5000, the method goes to Step 630.

Step 620: Select the first operating device 4000 to be an enabling device and the operating system source. Meanwhile, the operating system is booted into the DRAM 8000 for running. The control module 9000 will follow the user's requirement and send a signal to the CPU 1000 to turn on or turn off the power supply to the second operating device 5000.

Step 630: Select the second operating device 5000 to be an enabling device and the operating system source. Meanwhile, the operating system is booted into the DRAM 8000 for running. The control module 9000 will follow the user's requirement and send a signal to the CPU 1000 to turn on or turn off the power supply to the first operating device 4000.

Step 640: The operation is ended. No matter the computer is operated under the operating system on the first operating device 4000 or the second operating device 5000, when the user intends to shut down the computer or go to a sleeping mode, including S3 state (suspend to RAM) and S4 state (suspend to HDD), the control module 9000 will go to Step 650.

Step 650: Copy? The control module 9000 will asks the user whether to proceed with any copying. If yes, the method goes to Step 660 to copy; and if no, the method goes to Step 670 to end the procedure and complete the shutdown or go to the sleeping mode.

Step 660: Copy. To copy, turn on the first or the second operating device; select the objects to be copied and complete the copying; turn off the first or the second operating device; and the content of the BIOS unit is copied or updated.

Moreover, in the Step 660, it is able to synchronize the data files of the PIM sub-module 200, such as the contents of the aforesaid name card book and To-Do list. That is, in the operation of the operating system, the work of the database management function 250 of the PIM sub-module 200 can be done by the copying sub-module 9003 of the control module 9000. In other words, in an environment without the operating system, the data of the PIM sub-module 200 is synchronized and updated via the database management function 250; and, in an environment with the operating system, the synchronization and updating of data of the PIM sub-module 200 is completed via the copying sub-module 9003.

At this point, the control module 9000 is just like an "enhanced edition" of a file manager, and can copy not only application programs and drivers and data files to and between the first operating device 4000 and the second operating device 5000, but also the operating system on any one of the first and the second operating device to the other operating device.

Generally speaking, to execute an application program under an operating system, a user has first to complete the so-called "installation". In installation, files are copied, and related dependency files must also be copied to related directories under the operating system, so that the operating system can recognize and execute the program. A general file manager can usually copy only files or programs and data under a certain directory, but not the operating system as well as the application programs and related dependency files thereof that have been installed. However, the copying sub-module 9003 of the control module 9000 of the present invention can follow the user's selection to directly copy the operating system and the already installed application programs and related dependency files thereof. Therefore, the time needed to reinstall the operating system and application programs can be largely shortened.

Moreover, another feature of the control module 9000 is that, via the controlling and comparing sub-module 9002, the user can optionally select some programs from a large number of application programs that have already been installed under the operating system on one operating device, say the first operating device. And, via the copying sub-module 9003, it is able to copy the selected application programs and the dependency program files and data files related thereto to a destination operating device, say the second operating device. For example, when a user purchases Microsoft Visio, which is an application program, and completes installation thereof, there might be several tens or even several hundreds of executable files, application example files, teaching files, data files, and related link files in connection with the program. When the user selects to copy the Microsoft Visio program, all the above related programs and files will be copied to the destination operating device at the same time.

The control module 9000 can also update and thereby synchronize the contents of the PIM sub-module 200 of the BIOS with the personal information management content of the first operating device 4000 or the second operating device 5000.

In the previous steps, the powered off operating device and messages related to the settings thereof will be hidden by the hiding sub-module 9004, so that the computer is completely protected against virus invasion.

Step 670: End the operation and shut down the computer or go to the sleeping mode.

In brief, the computer system with two operating devices according to the present invention provides the following advantages:

(1) In the event the operating system is damaged due to virus invasion, or the first operating device is unexpectedly subjected to damaged track data and requires re-installation of the operating system, the other operating device can still maintain the original operating system and programs and data, and copy the same to the damaged operating device to quickly restore the latter to the earlier contents before the damage.

(2) The virus invasion can be reduced, and the first operating device 4000 and the second operating device 5000 have been specially processed in their power supply control procedure and hardware lines, so that a user has to enter a set of passwords to open and access the previously turned off first or second operating device 4000 or 5000. Under the control of the control module 9000, when one of the two operating devices is turned off, all the related settings about that operating device on the computer system are also changed at the same time. In other words, the operating system and any application program can not locate the hidden operating device. Therefore, no virus can invade the hidden operating device. In addition, when the power supply to the HDD is cut off, the probability of a damaged HDD due to an external vibration force is largely reduced, too.

(3) Provides good convenience and timeliness. The PIM sub-module 200, the DSC sub-module 300, and the DTV sub-module 400 built in the BIOS unit 3000 provide the benefit of instant-on, allowing the user to conveniently use the computer.

(4) Provides upgraded system stability and security. Since the present invention provides a "two operating devices" configuration, the first operating device 4000, that is, the HDD, can be in a non-booted condition in general operating condition. The noise from a working HDD is eliminated and the probability of a damaged HDD due to external vibration force is much lower than other commercially available computers.

The second operating device 5000 of the present invention can provide faster and more stable accessing speed than the HDD. Even if the second operating device 5000 is invaded by virus and becomes damaged, the operating system and the programs or data files thereon can be restored under the operation of the control module 9000 to minimize the disaster caused by virus invasion.

The control module 9000 of the present invention can also be implemented by incorporating it into a computer program product. The computer program product should include all features needed to execute the control method disclosed in the present invention; and, when a platform with the operating system has booted and run the computer program product, the computer program product should be able to verify that it can execute the control method of the present invention.

Moreover, the above-described control method can be implemented utilizing a computer readable recording medium, on which a computer program is stored for a computer to execute the above-described control method. The computer readable recording medium can be a floppy, a hard disk, a compact disk, a USB mass storage device, a magnetic tape, a database accessible over a network, or any other functionally equivalent storage medium that is known by one of ordinary skill in the art.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A computer system with two operating devices, comprising:
   at least one operating interface;
   a first hidden operating device, which includes an operating system and a plurality of data and programs, and the first hidden operating device connected to the operating interface;
   a second hidden operating device, which is used to store the operating system and the plurality of data and programs of the first hidden operating device, and the second hidden operating device connected to the operating interface;
   a central processing unit (CPU), which receives at least one signal to control the first and the second hidden operating devices via a power supply module, and to perform computation on the operating system and the plurality of data and programs via the operating interface;
   a control module, which sends the signal to the central processing unit for controlling the power on/off of the first and the second hidden operating devices and when any one of the first and the second hidden operating device is turned off and hidden, the operating device and any application programs cannot locate the hidden operating device, and copy the contents of any one of the first and the second hidden operating devices to the other one of them;
   a basic input output system (BIOS) unit for booting the operating system on any one of the first and the second hidden operating device into a dynamic random access memory (DRAM) for running; and
   a decoder unit for decoding the BIOS unit, so that the BIOS unit can be used by the CPU
   wherein the first hidden operating device is selected from the group consisting of a HDD and a non-volatile memory, and wherein the second hidden operating device is a non-volatile memory.

2. The computer system as claimed in claim 1, wherein the DRAM provides the CPU with functions of computing and temporary storing data, as well as booting and running programs.

3. The computer system as claimed in claim 1, wherein the control module includes a selecting sub-module, a controlling and comparing sub-module, a copying sub-module, and a hiding sub-module; the selecting sub-module selecting to boot the operating system from any one of the first operating device and the second operating device; the controlling and comparing sub-module checking and displaying the operating system and the plurality of data and programs on any one of the first and the second operating device, and selecting at discretion the operating system and the plurality of data and programs on one of the operating devices as the objects to be copied; the copying sub-module copying the selected objects to the other non-selected operating device; and the hiding sub-module hiding the non-selected operating device.

4. The computer system as claimed in claim 1, wherein the CPU is connected to a digital still camera (DSC) device and a digital television (DTV) device.

5. The computer system as claimed in claim 4, wherein the BIOS unit further includes a DSC device driver, a DTV device driver, and a working mode selection module for selectively enabling the DSC device, the DTV device, the first hidden operating device, and the second hidden operating device, and wherein when one of the DSC and DTV devices is selected to turn on, the non-selected DSC or DTV device is turned off.

6. The computer system as claimed in claim 5, wherein the working mode selection module includes a personal information management (PIM) sub-module, a DSC sub-module, a DTV sub-module, and an operating system (OS) device select sub-module; the PIM sub-module providing a computing function, a name card book function, a To-Do list function, and a database management function; the DSC sub-module being adapted to enable the DSC device; the DTV sub-module being adapted to enable the DTV device; the OS device select sub-module being used to select one of the first and the second hidden operating device for booting the operating system wherein when one of the sub-module is selected to turn on, the non-selected sub-modules are turned off.

7. The computer system as claimed in claim 6, wherein the PIM sub-module, the DSC sub-module, the DTV sub-module, and the OS device select sub-module are controlled via a remote signal, and the remote signal being sent by pushing at least one hot key.

8. The computer system as claimed in claim 6, wherein the DSC sub-module provides a photo shooting function, a video recording function, an audio recording function, a photo browsing and display function, a film browsing and playing function, and an editing function.

9. The computer system as claimed in claim 6, wherein the DTV sub-module provides a channel-selection and volume/image control function, a program recording function, a video file playback function, and a video file editing function.

* * * * *